United States Patent [19]

Roba

[11] Patent Number: 4,627,865
[45] Date of Patent: Dec. 9, 1986

[54] PROCESS OF MANUFACTURING OPTICAL FIBERS OF EXTREMELY LOW LOSS IN THE MEDIUM INFRARED

[75] Inventor: Giacomo Roba, Turin, Italy

[73] Assignee: Cselt Centro Studi e Laboratori Telecomunicazioni S.p.A., Turin, Italy

[21] Appl. No.: 650,296

[22] Filed: Sep. 12, 1984

[30] Foreign Application Priority Data

Sep. 15, 1983 [IT] Italy .................................. 67956 A/83

[51] Int. Cl.⁴ ............................................ C03B 37/018
[52] U.S. Cl. ...................................... 65/3.12; 65/18.2; 65/DIG. 16
[58] Field of Search ...................... 65/3.12, 18.2, 3.11, 65/2, DIG. 16; 501/904, 40, 37

[56] References Cited

U.S. PATENT DOCUMENTS 4,378,987 4/1983 Miller et al. ...................... 65/18.2 X

FOREIGN PATENT DOCUMENTS 57-175743 10/1982 Japan ............................ 65/DIG. 16

OTHER PUBLICATIONS

Article entitled "Preparation of Low Loss Fluoride Glass Fibers" by S. Mitachi et al., pp. 55–56.

Primary Examiner—Kenneth M. Schor
Attorney, Agent, or Firm—Karl F. Ross; Herbert Dubno

[57] ABSTRACT

The process of manufacturing optical fibers of extremely low loss in the medium infrared permits the fabrication of glass preforms having as basic materials metal-fluorides obtained from vapor-phase reactants.

3 Claims, No Drawings

PROCESS OF MANUFACTURING OPTICAL FIBERS OF EXTREMELY LOW LOSS IN THE MEDIUM INFRARED

DESCRIPTION

FIELD OF THE INVENTION

My present invention relates to the industrial production of physical carriers for optical telecommunications systems and, more particularly, to a process for the fabrication of optical fibers having extremely low loss in the medium infrared.

BACKGROUND OF THE INVENTION

Various materials exist for which a minimal intrinsic attenuation of the order of $10^{-2}$ to $10^{-4}$ dB/km can be predicted in the spectral region comprised between 2 and 12 $\mu$m. They are therefore considered to be suited to the fabrication of extremely low loss optical fibers to be used for transmission systems with widely spaced repeaters, operating in the medium infrared range. Materials used to manufacture optical fibers must also have various characteristics apart from the optical properties, namely, high mechanical strength, chemical and structural stability, and low reactivity with the environment.

Among the various materials those whose characteristics more strictly satisfy these requirements are halide glasses and more particularly fluoride glasses having metal fluorides as basic ingredients.

Some of the main fluoride compounds are listed below; they can be used as glass "formers" or as matrix "stabilizers" or "modifiers" to fabricate fluoride glass structures. For such compounds and for their metallic elements and relevant oxides, melting temperature $T_f$, boiling temperature $T_e$, and sublimation or decomposition temperature are indicated below, when known.

| | $T_f$ (°C.) | $T_e$ (°C.) |
|---|---|---|
| AlF$_3$; Al; Al$_2$O$_3$ | 1291 subl; 660.2; 2045 | —; 2467; 2980 |
| BaF$_2$; Ba; BaO | 1280; 725; 1293 | 2173; 1140; 2000 |
| BiF$_2$; Bi; Bi$_2$O$_3$ | 727; 271.3; 820 | —; 1560; 1890 |
| GaF$_3$; Ga; Ga$_2$O$_3$ | 800; 29.78; 1900 | 1000; 2403; — |
| GdF$_3$; Gd; Gd$_2$O$_3$ | —; 1312; — | —; 3000; — |
| HfF$_4$; Hf; HfO$_2$ | —; 2150; 2812 | —; 5400; 5400 |
| LaF$_3$; La; La$_2$O$_3$ | —; 920; 2315 | —; 3469; 4200 |
| LiF; Li; Li$_2$O | 842; 179; >1700 | 1676; 1317; — |
| NaF; Na; Na$_2$O | 988; 97.8; 1275 subl | 1695; 892; — |
| PbF$_4$; Pb; PbO$_2$ | 855; 327.5; 290 dec | 1290; 1744; — |
| ScF$_3$; Sc; Sc$_2$O$_3$ | —; 1539; — | —; 2727; — |
| TlF$_3$; Tl; Tl$_2$O$_3$ | 550 dec; 303; 717 | —;1457; 875 dec |
| ThF$_4$; Th; ThO$_2$ | >900; 1700; 3050 | —; ~4000; 4400 |
| ZnF$_2$; Zn; ZnO | 872; 419; 1975 | 1500; 907; — |
| ZrF$_4$; Zr; ZrO$_2$ | 600 subl; 1852; 2715 | —; 3578; — |

Even though glass structures derived from elements of Group II (Be, Zn, Ba) of the Periodic Table or of Group III (Al, Sc, La, Th) may be used, matrices derived from the elements of Group IV (Hf, Zr) have proved to be particularly suitable for optical transmission in the medium infrared, range of 2 to 6 $\mu$m. Fluorohafnate and fluorozirconate glasses, discovered in France in 1976, are in common use and have all the characteristics necessary for a material to be used in the optical telecommunications field.

Nowadays these materials are treated by the same techniques as have from multicomponent glass technology.

Starting from the fluoride compound which has been obtained by chemical reaction of the basic element or its oxide, mixtures are prepared with the various components in the desired concentrations.

Then the annealing, vitrification and possibly purification are effected inside a furnace, in graphite or platinum crucibles. Finally the vitrified material is collapsed into cylindrical rods or in preforms to feed drawing crucibles or to be directly drawn.

All these operations are highly polluting and, above all, do not permit checks on the optical core/cladding interface structure. Hence, for oxide glasses as well as for halide glasses such direct material treating techniques are not suited to fabricate ultra-low loss optical structures losses of ($10^{-3}$ to $10^{-4}$ dB/Km), wth loss values practically coincident with minimum intrinsic loss values theoretically possible for such materials.

Owing to the high melting and boiling temperatures of the compounds and elements of the table given above, indirect synthesis techniques such as the traditional CVD processes cannot be used. In fact inorganic compounds of such elements, which are easily vaporized at ambient temperature do not exist.

Easy vaporization at ambient temperature is fundamental in the applications of CVD process to optical fibre preform manufacture, since a high temperature for the compound vaporization not only entails considerable complications for deposition plants but does not allow an accurate check of the reaction ambient so that pollution can occur.

OBJECT OF THE INVENTION

It is an object of the present invention to permit the manufacturing of high-purity optical fibers by the use of metal fluoride glasses without the disadvantages mentioned above.

DESCRIPTION OF THE INVENTION

The present invention provides a process for manufacturing optical fibres of extremely low loss in the medium infrared, wherein the material used for the preform fabrication is a metal fluoride glass obtained from vapor phase reactants. According to the invention the glass is obtained by the reaction between an organometallic compound of the element whose fluoride compound is desired and a gaseous reactant containing fluorine.

The foregoing and other characteristics of the present invention will become clearer from the following description of a preferred embodiment thereof given by way of non-limiting example.

Organometallic compounds as well as organic compounds, must represent only the carriers in vapor phase at ambient temperature, of the metal whose halide compound is desired.

They are not to contain polluting elements or groups, such as OH$^-$ groups or transition-metal ions, or even oxygen.

The constraint of oxygen exclusion considerably limits the choice of the carrier compound in comparison with the case of oxide glasses.

Moreover, the reaction products must be gaseous compounds, except for the metallic halide, so that they can be easily expelled by the same flow of carrier gases.

The requirements demanded above are satisfied by organometallic compounds of the type:

$$M(C_\alpha H_\beta)_\xi \tag{1}$$

where M represents the metal whose halide compound is to be obtained by reactive synthesis, C is carbon, H is hydrogen and symbols $\alpha$, $\beta$, $\xi$ represent respectively the molecular coefficients of atoms C, H and group C, H.

In fluorine presence and by thermal activation the organometallic compound gives rise to the following synthesis reaction:

$$M(C_\alpha H_\beta)_\xi + \xi(\alpha+\beta)F_2 \rightarrow MF_\xi + \alpha\xi CF_4 + \beta\xi HF \qquad (2)$$

where $$\beta = 1 + 2\alpha$$

The reaction products are then the metal fluoride ($MF_\xi$) and two volatile compounds ($CF_4$ and $HF$).

Fluorine compounds such as $CCl_2F_2$, $CClF_3$, $CF_4$, $HF$ can be used instead of $F_2$.

By way of example the characteristics and the relevant reactions of two organometallic compounds of lead and aluminum are given below:

|  | $T_f$ (°C.) | $T_e$ (°C.) |
|---|---|---|
| Al(CH$_3$)$_3$ (trimethylaluminum) | 0 | 130 |
| Al(C$_2$H$_5$)$_3$ (triethylaluminum) | −50.5 | 194 |
| Pb(CH$_3$)$_4$ (tetramethyllead) | −27.5 | 110 |
| Pb(C$_2$H$_5$)$_4$ (tetraethyllead) | −136.8 | 200 |

$$\begin{cases} Al(CH_3)_3 + 12\,F_2 \rightarrow AlF_3 + 3CF_4 + 9HF \\ Al(C_2H_5)_3 + 21\,F_2 \rightarrow AlF_3 + 6CF_4 + 15HF \end{cases}$$

$$\begin{cases} Pb(CH_3) + 16\,F_2 \rightarrow PbF_4 + 4CF_4 + 12HF \\ Pb(C_2H_5) + 28\,F_2 \rightarrow PbF_4 + 8CF_4 + 20HF \end{cases}$$

Another type of organometallic compound can be used as well:

$$M(C_\gamma H_\delta)_\psi A_\eta \qquad (3)$$

where A represents a halogen which can be chlorine or fluorine.

The reaction is the following:

$$M(C_\gamma H_\delta)_\psi A_\eta + \psi(\gamma+\delta)F_2 \rightarrow MF_{(\psi+\eta)} + \gamma\psi CF_4 + (\delta\psi - \eta)\cdot HF + \eta HA \qquad (4)$$

where $\delta = 1 + 2\gamma$.

Also in this case a solid halide compound and some volatile compounds ($CF_4$, $HF$, $HA$) are produced.

By way of example, we give below the characteristics and the relevant reaction of an aluminum organometallic compound, the diethylaluminum chloride:

| (C$_2$H$_5$)$_2$AlCl | $T_f$(°C.) = −50 | $T_e$ (°C.) = 87 at 200 mm · Hg |
|---|---|---|
| (C$_2$H$_5$)$_2$AlCl + 14 F$_2$ → AlF$_3$ + 4CF$_4$ + 9 HF + HCl | | |

Within organometallic compounds (1) and (3), compounds can be found which at ambient temperature are in liquid state and then can be easily vaporized, for example by bubbling an inert carrier gas (Ar) through the liquid.

In the examples cited for aluminum and lead, the compounds used meet these requirements.

Once chosen the compounds and reactions, the deposition process and preform fabrication can be carried out by applying techniques already known within semiconductor technology as OM-CVD (Organometallic Chemical Vapour Deposition) duly modified to take into account the different symmetry of the product (planar in one case, cylindrical in the other), the different composition and crystalline or vitreous structure, the different chemical and physical properties of materials. Alternatively, the methods typical of differently-doped oxide glass and in particular silica glass fibers can be used.

Both outside and inside vapor deposition techniques are suitable. Taking into account the purity requirements demanded of these materials to exploit to the maximum their optical properties, inside techniques are better suited.

In this case the supporting tube can be a fluoride glass with glass matrix similar to that of the external cladding of the fibre.

Both refractive indices and thermal expansion coefficients as well as glass transition temperatures are to be matched.

For instance, let us consider an optical fiber whose core and cladding consist of a quaternary compound $ZrF_4$—$BaF_2$—$GdF_3$—$AlF_3$, respectively in the following compositions expressed in molar percentage 61.8$ZrF_4$—32.3$BaF_2$—3.9$GdF_3$—2$AlF_3$ with refractive index $n_D$=1.519 and 59.2.$ZrF_4$—31.0$BaF_2$—3.8$GdF_3$—6$AlF_3$ with refractive index $n_D$= 1.514 as described in the paper "Preparation of Low Loss Fluoride Glass Fibers"—S. Mitachi, T. Kanamori, T. Miyashita, Japanese Journal of Applied Physics Vol. 21, No. 1, January, 1982, pp. L55-L56.

The supporting tube, which is used both as a reactor and as external fiber cladding, must be composed of a quaternary glass compound of the same type, such as, for instance, 58.2$ZrF_4$—30$BaF_2$—3.8$GdF_3$—8$AlF_3$.

An alternative solution entails the use of a supporting tube composed of multicomponent oxide glass matrices containing sodium-boron-potassium silicates.

Also in this case the reactor glass matrix must meet specific requirements in terms of refractive index, expansion coefficient and glass transition temperature. To increase the degree of chemical compatibility between oxide and fluoride matrices, the glass on the internal surface of the reactor can be enriched with fluorine by thermal diffusion.

In this way the double goal is reached of (1) using a reactor with characteristics similar to those of the glass matrices to deposit and which is then apt to offer a suitable support for the deposition and (2) of obtaining an external protecting cladding for the preform, hardly reactive with the environment and then apt to preserve optical chemical and mechanical properties of the inside material.

It is clear that what described has been given only by way of non limiting example. Variations and modifications are possible without going out of the scope of the present invention.

I claim:

1. In a process for manufacturing optical fibers of extremely low loss in transmission of infrared radiation, wherein a preform from which the fibers are drawn is made from metal fluoride glass obtained by vapor phase reaction and deposition on a substrate, the improvement wherein said glass is obtained by the reaction between a gaseous reactant containing fluorine and an organometallic compound of the formula $$M(C_\gamma H_\delta)_\psi A_\eta$$

where M represents a metal whose fluoride is to be obtained by reactive synthesis, C is carbon, H is hydrogen, A is a halogen, and symbols $\gamma, \delta, \psi, \eta$ are all at least equal to one and represent the molecular coefficients of atoms C, H, of group CH and of halogen A respectively.

2. The improvement defined in claim 1 wherein said gaseous reactant containing fluorine is selected from the group consisting of:

$F_2$, $CCl_2F_2$, $CClF_3$, and $CF_4$

3. The improvement defined in claim 1 wherein said reaction is obtained inside a supporting tube made of oxide glass, the material produced is deposited inside the same tube, and the inside surface of said supporting tube is enriched with fluorine by thermal diffusion.

* * * * *